US008911235B1

(12) United States Patent
Baxter

(10) Patent No.: US 8,911,235 B1
(45) Date of Patent: Dec. 16, 2014

(54) SHOOTING TRAINING DEVICE

(71) Applicant: Malcom Baxter, Nolensville, TN (US)

(72) Inventor: Malcom Baxter, Nolensville, TN (US)

(73) Assignee: TriggerMaster, Inc., Nolensville, TN (US)

( * ) Notice: Subject to any disclaimer, the term of this patent is extended or adjusted under 35 U.S.C. 154(b) by 0 days.

(21) Appl. No.: 14/053,594

(22) Filed: Oct. 14, 2013

Related U.S. Application Data

(63) Continuation of application No. 11/504,313, filed on Aug. 15, 2006, now Pat. No. 8,556,628.

(51) Int. Cl.

| | |
|---|---|
| ***F41A 33/00*** | (2006.01) |
| ***F41G 1/38*** | (2006.01) |
| ***F41A 33/06*** | (2006.01) |
| ***F41A 33/02*** | (2006.01) |
| ***F41A 19/10*** | (2006.01) |
| ***F41A 19/00*** | (2006.01) |
| *G06F 3/0338* | (2013.01) |
| *G05G 9/047* | (2006.01) |
| *F41J 5/02* | (2006.01) |
| *F41G 3/26* | (2006.01) |

(52) U.S. Cl.
CPC ......... *F41A 19/10* (2013.01); *A63F 2300/8076* (2013.01); *F41G 1/38* (2013.01); *F41A 33/06* (2013.01); *F41A 33/02* (2013.01); *G06F 3/0338* (2013.01); *G05G 9/047* (2013.01); *F41J 5/02* (2013.01); *F41G 3/2655* (2013.01); *F41G 3/2605* (2013.01); *F41A 19/00* (2013.01)
USPC .................. 434/16; 434/11; 434/17; 434/18; 434/19; 434/20; 434/21; 434/22; 434/23; 434/24; 434/27; 463/51; 463/52; 463/53; 463/54; 463/49; 463/2; 273/348; 235/404

(58) Field of Classification Search
CPC ......... F41A 33/02; F41A 33/00; F41A 19/10; F41A 33/06; F41G 3/2655; F41G 1/38; F41G 3/2605; F41J 5/02; F41J 5/08; G05G 9/047; A63F 13/04; A63F 2300/8076; G06F 3/0338
USPC .............. 434/11, 16, 17, 18, 19, 167; 73/379, 73/774, 760; 345/156, 157, 158, 161
See application file for complete search history.

(56) References Cited

U.S. PATENT DOCUMENTS

| | | | |
|---|---|---|---|
| 1,786,614 | A | 12/1930 | Howard |
| 2,077,383 | A | 4/1937 | Foisy |
| 2,325,599 | A | 8/1943 | Fidelman |

(Continued)

OTHER PUBLICATIONS

Army Marksmanship Training Guide: Chapter 3 Trigger Control by http://www.bullseyepistol.com/chapter3.htm, Feb. 23, 2005.

*Primary Examiner* — Jack Yip
(74) *Attorney, Agent, or Firm* — Waddey Patterson, P.C.; Matthew C. Cox

(57) ABSTRACT

The invention is a trigger pull training device for improving trigger pull technique. The device has a frame with a trigger track opening and a trigger which goes through that opening. A proximity sensor or a plurality of proximity sensors are placed proximate the trigger track opening. The sensors are connected to an indicator whereby pulling the trigger such that the trigger is within the sensing zone causes the proximity sensor to emit a signal. A plurality of sensors can be lined along the trigger track opening to indicate the accuracy of any pull.

6 Claims, 8 Drawing Sheets

16 56 26A 14 24 26 42 26B 20 12 30 10 40 46 40 32 44 28 22 47 36

(56) References Cited

U.S. PATENT DOCUMENTS 2,396,017 A 3/1946 Martin
2,559,010 A 7/1951 Cutler
3,365,975 A 1/1968 Hathaway
3,861,069 A 1/1975 Heurlen
4,725,235 A * 2/1988 Schroeder et al. .............. 434/18
4,782,335 A 11/1988 Gussin
4,913,655 A 4/1990 Pinkley et al.
5,316,479 A 5/1994 Wong et al.
5,345,214 A 9/1994 Tsui
5,453,758 A 9/1995 Sato
5,532,476 A 7/1996 Mikan
5,658,238 A 8/1997 Suzuki et al.
5,761,954 A 6/1998 Dvorak
5,831,596 A 11/1998 Marshall et al.
5,847,694 A 12/1998 Redford et al.
5,954,507 A 9/1999 Rod
6,144,367 A 11/2000 Berstis
6,181,327 B1 1/2001 Lin et al.
6,243,077 B1 6/2001 Manara et al.
6,257,893 B1 7/2001 Trabut
6,545,661 B1 4/2003 Goschy et al.
6,672,962 B1 1/2004 Ozaki et al.
6,739,873 B1 5/2004 Rod et al.
6,854,975 B2 2/2005 Ranzinger
7,329,127 B2 2/2008 Kendir et al.
7,587,277 B1 9/2009 Wells
7,774,155 B2 8/2010 Sato et al.
7,813,581 B1 10/2010 Fitzpatrick
8,275,544 B1 9/2012 Wells
2002/0162193 A1 11/2002 Frys
2002/0174588 A1* 11/2002 Danner et al. ............... 42/70.09
2002/0186204 A1 12/2002 Kim
2003/0022716 A1 1/2003 Park et al.
2003/0189547 A1 10/2003 Lee et al.
2003/0221684 A1 12/2003 Rice
2005/0014113 A1 1/2005 Fleck
2005/0021282 A1 1/2005 Sammut
2006/0005447 A1 1/2006 Lenner
2007/0190495 A1 8/2007 Kendir
2008/0105050 A1 5/2008 Kraetz
2009/0233768 A1 9/2009 Merzenich
2009/0262074 A1 10/2009 Nasiri et al.
2011/0118023 A1 5/2011 Fu
2011/0167691 A1* 7/2011 Bowman et al. ............... 42/1.01
2012/0330182 A1 12/2012 Alberts

* cited by examiner

SHOOTING TRAINING DEVICE

BACKGROUND OF THE INVENTION

The present invention relates generally to a device for improving the trigger pull technique of a marksman.

Marksmen and amateur shooters require a method of learning appropriate shooting techniques. One of the most subtle and difficult shooting techniques to learn is an appropriate pull of the trigger. Normally, an appropriate trigger pull is considered an in-line trigger pull. During an inline trigger pull, the trigger is pulled along the same line as the target and the point of aim at the gun by the marksman. If a marksman jerks the trigger to the left or to the right (or out of line), the barrel of the gun will move thereby causing a shot to miss the target. Thus, although the marksman has appropriately sighted the target, a subtle mistake such as not pulling the trigger appropriately will lead to an inaccurate shot. Consequently, an efficient method of teaching a learning an appropriate trigger pull is desired. The present invention discloses a device which indicates to the marksman when he has made an inappropriate lateral pull of the trigger. None of the prior art teaches a method of correcting lateral jerks in a marksman's trigger pull. One previous device comprises a contact strip or piece secured at one end to a block of insulating material fixed in one corner of a contact support. One end of the contact support is bifurcated to provide a tight embrace of a trigger guard. An expansion coil spring tends to press the contact piece into a normal position in the path of travel of the trigger when it is moved beyond the firing position. Thus, the device is placed on the trigger guard behind the trigger. Clearly, this device has several disadvantages. First, this device cannot indicate an inappropriate lateral jerk of the trigger by a marksman. The device only indicates that the user has pulled the trigger beyond the firing point. Thus, the device corrects the force applied to the trigger by the marksman, not the appropriate movement of the trigger through the trigger track opening. Second, the device places the measuring means on the trigger guard. As a result, the device cannot measure the movements of the trigger within the trigger track opening.

BRIEF SUMMARY OF THE INVENTION

What is needed is a trigger pull training device which can detect a jerk of the trigger pull by a marksman. The invention is a trigger pull training device for improving trigger pull technique. The device has a frame with a trigger track opening and a trigger which goes through that opening. A proximity sensor or a plurality of proximity sensors are placed proximate the trigger track opening. The sensors are connected to an indicator whereby pulling the trigger such that the trigger is within the sensing zone causes the proximity sensor to emit a signal. A plurality of sensors can be lined along the trigger track opening to indicate the accuracy of any pull.

Accordingly, one object of the present invention is to teach a marksman the appropriate trigger pull technique.

Another object of the present invention is to detect an inappropriate lateral jerk by the marksman during a trigger pull.

Yet another object of the present invention is to indicate the degree of error in the trigger pull technique.

Still another object of the present invention is to provide a device which can vary the degree of difficulty of achieving an appropriate trigger pull indication.

DETAILED DESCRIPTION OF THE INVENTION

Figure 1:
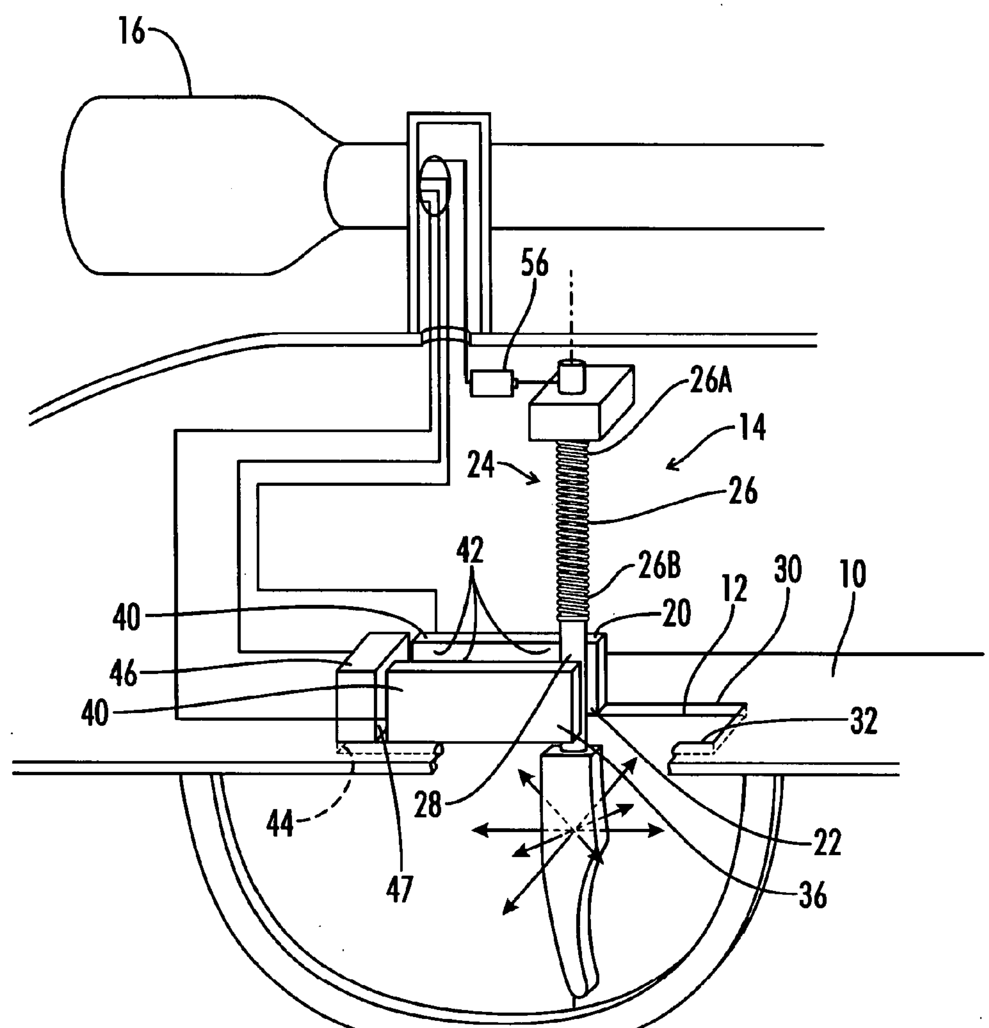
FIG. 1 is a side view of the interior of a first embodiment of the invention.
Figure 2:
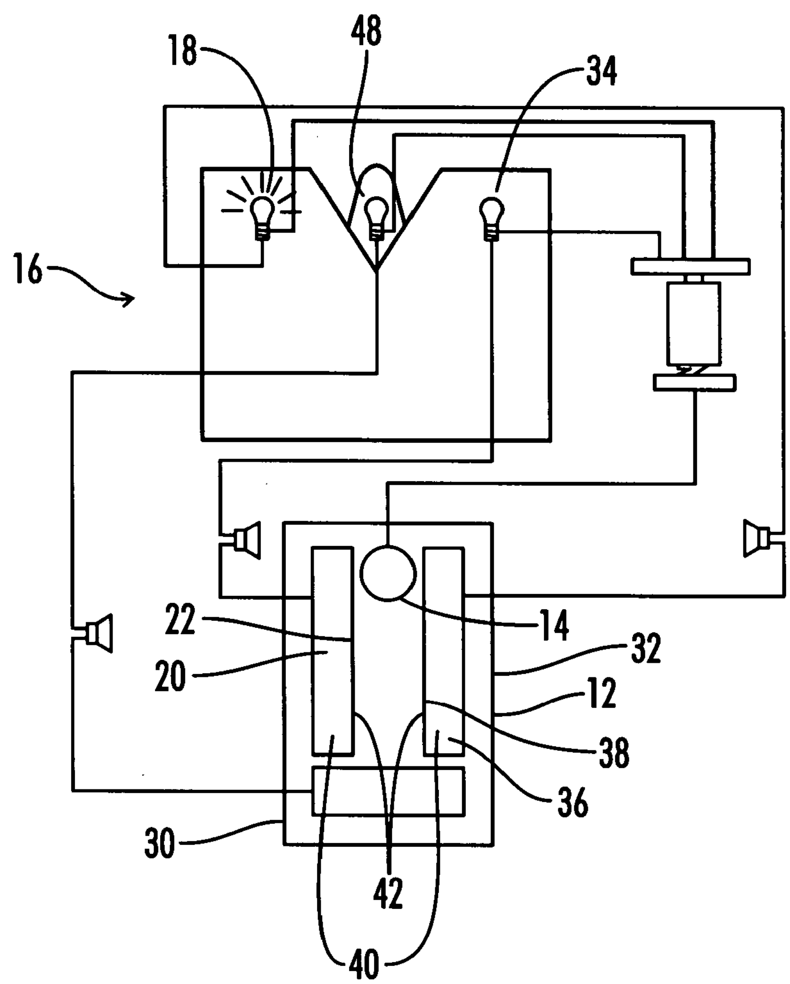
FIG. 2 is a top view of the first embodiment of this invention within the trigger track opening, with a circuit diagram for the indicator.

Referring now to FIGS. 1 and 2, the basic idea of the trigger pull training device is displayed. The trigger pull training device has a frame 10 having a trigger track opening 12. While the frame 10 in the preferred embodiment is in the shape of a gun, this is not a requirement for the proper operation of the device. A trigger 14 is coupled to the frame 10 such that the trigger 14 goes through the trigger track opening 12. In this manner, the device contains all of the necessary components to simulate the pull of a trigger on a gun. Another component of the device is an indicator 16 which is utilized to communicate to the user when either an appropriate or inappropriate trigger pull has been made. The indicator 16 may have a first signaling device 18 for emitting a first signal. This signal is utilized to communicate information about the trigger pull to the marksman. In order to detect the movements during a trigger pull, a proximity sensor 20 with a sensing zone 22 is mounted proximate the trigger track opening 12. The proximity sensor 20 is connected to the indicator 16, whereby pulling the trigger 14 within the sensing zone 22 emits the first signal from the indicator 16. Thus, the marksman is provided with a means that communicates certain movements of his trigger pull within the trigger track opening 10. The marksman thus can easily determine whether an in-line trigger pull has been achieved.

This device may be utilized in an actual gun frame. Thus, the trigger would be attached by a conventional trigger pull mechanism wherein the proximity sensor 20 would be mounted proximate the trigger track opening 12. However, as shown in FIG. 1, the trigger 14 may further comprise a recoiling member 24 which couples the trigger 14 to the frame 10. The recoiling member 24 simulates the feel of a trigger pull. The recoiling member 24 may comprise a spring 26 and a rod 28. The spring 26 has a first spring end 26A and a second spring end 26B which couples the trigger to the frame 10. The second spring end 26B is coupled to the rod 28 such that the rod 28 goes through the trigger track opening 12. In this manner, the rod 28 is the portion of the trigger 14 which goes through the trigger track opening 12. One advantage of utilizing this arrangement, is that the spring allows 360° of freedom for the trigger 14. Thus, the arrangement facilitates the sensing of the direction of error by the marksman. Furthermore, this arrangement provides an additional advantage when the spring 26 is interchangeable. By changing the gauge of the springs, the marksman can vary the poundage or pressure necessary to pull the trigger 14.

As mentioned previously, this device can be utilized to measure an inappropriate lateral jerk by the marksman. Again referring to FIGS. 1 and 2, a trigger track opening 12 normally has a first lateral edge 30 and a second lateral edge 32. The lateral edges 30 and 32 are lateral to the trigger 14. The first lateral edge 30 is oppositely disposed from the second lateral edge 32 whereby first and second lateral edges 30 and 32 are on opposite sides of the trigger track opening 12.

In order to detect an inappropriate lateral jerk of the trigger, the proximity sensor 20 is mounted proximate one of the lateral edges 30, 32 whereby the first signal indicates that the trigger 14 has been inappropriately pulled toward the lateral edge 30 or 32. In one embodiment the proximity sensor 20 is mounted proximate the first lateral edge 30, thus indicating that the trigger 14 has been inappropriately pulled toward the first lateral edge 30. In order to detect an inappropriate pull of the trigger 14 on the opposite lateral edge 32, the indicator 16 further comprises a second signaling device 34 which emits a second signal. A second proximity sensor 32 which has a second sensing zone 38 is mounted proximate the second lateral edge 32. As with the first proximity sensor 20, the second proximity sensor 36 is connected to the indicator 16 whereby pulling the trigger 14 within the second sensing zone 38 emits the second signal from the indicator 16 thereby indicating that the trigger 14 has been inappropriately pulled toward the second lateral edge 32. This embodiment thus illustrates how the invention can indicate to a marksman whether he has made an inappropriate lateral jerk of the trigger 14.

Proximity sensors in this application can be any device which measures the presence of an object within a particular sensing zone. The sensor can thus be any type of electromagnetic sensor, any type of mechanical sensor, any type of chemical sensor, or any type of optical or radiation sensor. In the preferred embodiment, however, the proximity sensors of this application are conductive members. In other words, they are contact type electromagnetic sensors. As illustrated in FIGS. 1 and 2, each proximity sensor 20, 36 is a conductive member 40 wherein each sensing zone 22, 38 is the surface area 42 on the conductive member 40. When the trigger is pulled such that the trigger 14 contacts the surface area 42, the respective signal is emitted from the indicator 16. In the embodiment shown in FIGS. 1 and 2, the trigger 14 completes a circuit to the indicator 16 thereby providing an electrical path for the emission of the signal.

As shown in FIGS. 1 and 2, the device also has a way of indicating an appropriate trigger pull. The trigger track opening 12 may have a back edge 44 behind the trigger 14. In order to detect an appropriate trigger pull, a proximity sensor 46 with the sensing zone 47 is mounted proximate the back edge 44. The indicator 16 has a third signaling device 48 which is connected to the third proximity sensor 46. When the marksman pulls the trigger 14 within the third sensing zone 47, the indicator 16 emits the third signal from the indicator 16. This indicates an appropriate pull of the trigger 14 because the marksman never pulled the trigger 14 sufficiently close to the lateral proximity sensors 20 and 36 to indicate an error in the trigger pull. Thus, the marksman has achieved an in-line trigger pull by pulling the trigger 14 in line with the target and the point aimed at the by the marksman at the frame 10.

Figure 3:
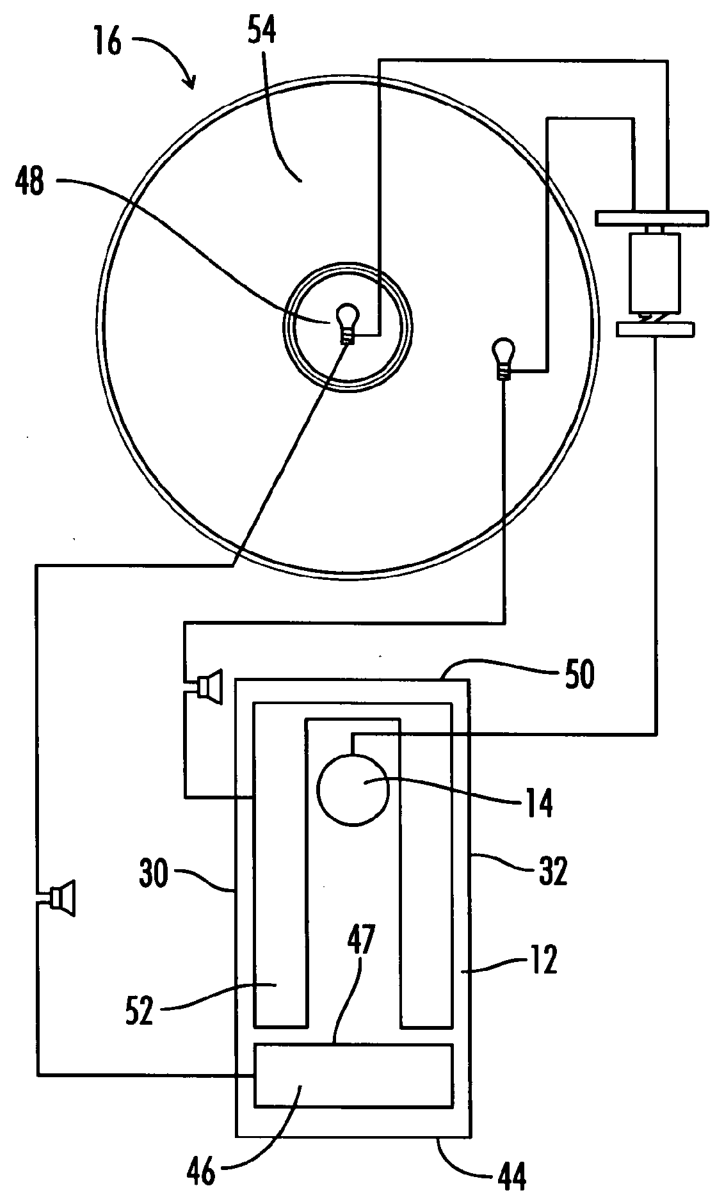
FIG. 3 is a top view of a second embodiment of the invention with a circuit diagram to the indicator.

A third embodiment of the present invention is shown in FIG. 3. In this embodiment only one proximity sensor 52 is necessary to indicate an inappropriate pull of the trigger 14. In addition to the lateral edges 30 and 32 and the back edge 44 the trigger track opening may have a front edge 50, the front edge 50 being in front of the trigger 14. In order to detect all conceivable directions of inappropriate jerk by the marksman, the proximity sensor 52 is mounted proximate the first lateral edge 30 the front edge and the second lateral edge 32 whereby a signal from the indicator 16 indicates an inappropriate trigger pull. Thus, signaling device 54 simply indicates an error in the trigger pull. As in previous embodiments, the indicator 16 may have another signaling device 48 for indicating an appropriate trigger pull. A proximity sensor 46 with a second sensing zone 47 is mounted proximate the back edge 44. Pulling the trigger 14 within the second sensing zone 47 emits the second signal from the indicator 16. This signal thus indicates an appropriate pull of the trigger 14.

Figure 4:
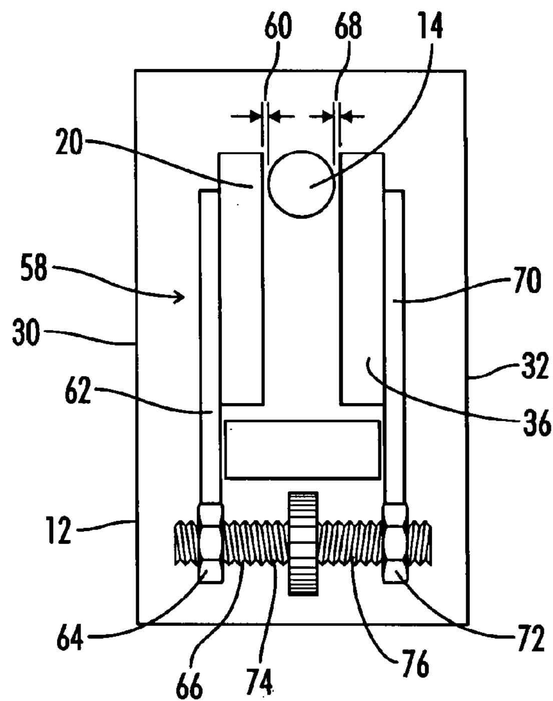
FIG. 4 is a top view of the proximity sensors mounted on an offset adjustment device.
Figure 5:
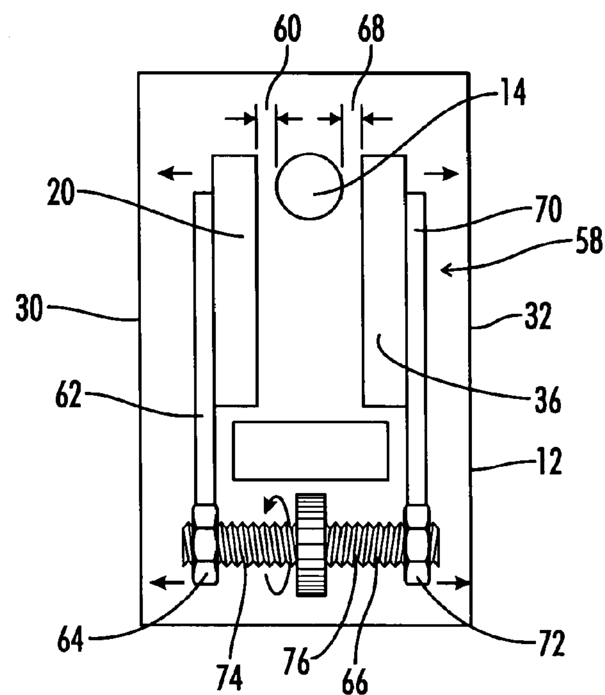
FIG. 5 is a top view of the proximity sensors mounted on an offset adjustment device, while the offset adjustment device is adjusting the offset of the sensors to the trigger.

Now referring to FIGS. 4 and 5, an offset adjustment device 58 allows a marksman to adjust the difficulty of achieving a trigger pull without an error indication. The offset adjustment device 58 mounts the first proximity sensor 20 a first offset distance 60 from the trigger 14 and similarly mounts the second proximity sensor 36 a second offset distance 68 from the trigger 14. The offset adjustment device 58 therefore can vary each offset distance 60 and 68 from the trigger. In order to accomplish this, the offset adjustment device 58 may have a first attachment member 62 for mounting the first proximity sensor 20 proximate the first lateral edge 30, and a second attachment member 68 for mounting the second proximity sensor 36 proximate the second lateral edge 32. In order to vary offset distances 60 and 68 each attachment member 62, 68 have a threaded insert 64, 72. A threaded member 66 inserts into the threaded insert 64 and 66. The threaded member 66 has a first section 74 and a second section 76. The first section 74 is threaded in the opposite direction of the second section 76. In this manner, by twisting the threaded member 66 in one direction the offset distances 60 and 68 are decreased. If the threaded member 66 is twisted in the opposite direction, offset distances 60 and 68 are increased thereby decreasing the difficulty of achieving an appropriate trigger pull. In the preferred embodiment threaded inserts 64 and 72 are conventional nuts. However, all that is required is that attachment members 62 and 68 have threaded inserts 64 and 72 such that twisting threaded member 66 simultaneously varies offset distances 60 and 68.

Figure 6:
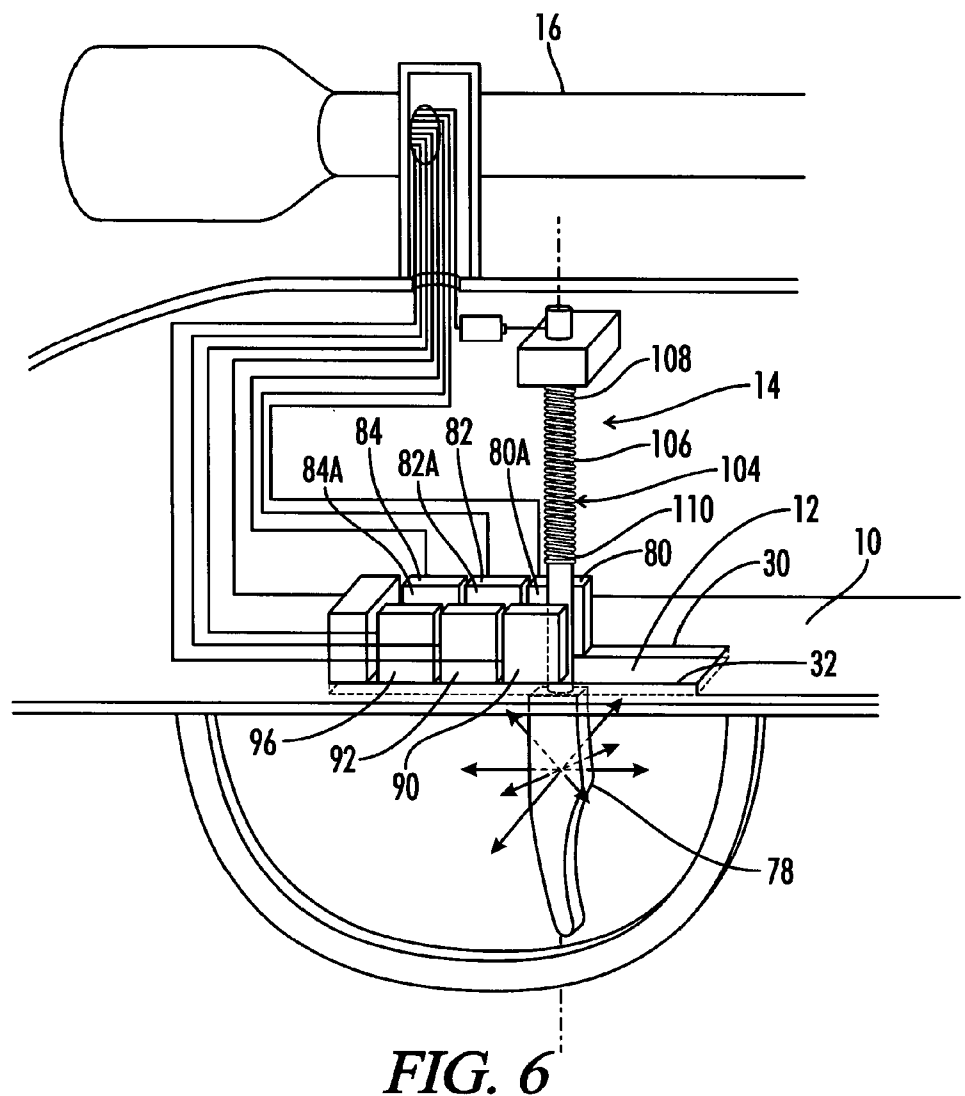
FIG. 6 is a side view of the interior of a third embodiment of the present invention.
Figure 7:
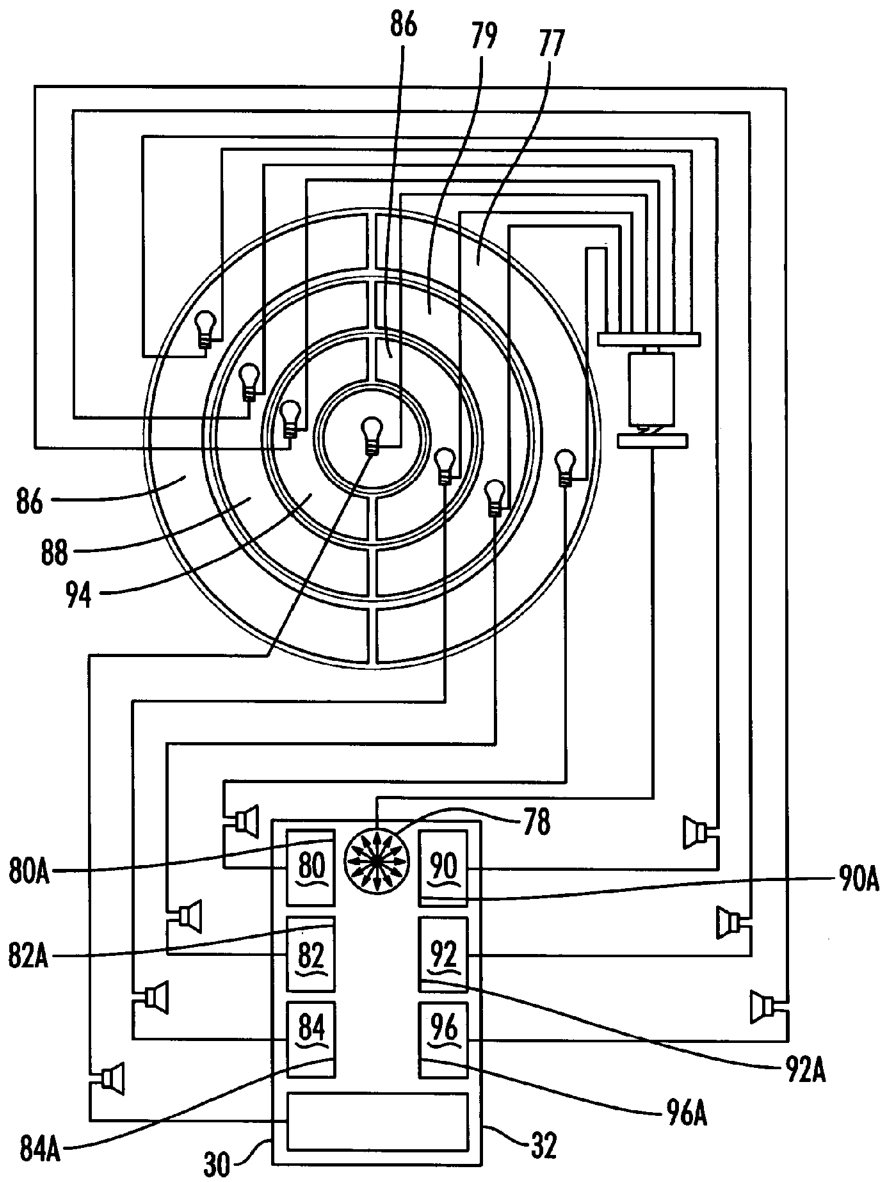
FIG. 7 is a top view of the third embodiment of this device with a circuit diagram to the indicator.

Referring now to FIGS. 6 and 7, another embodiment of the present invention is shown. As previously mentioned, this invention teaches a method of determining the degree of error by the marksman. One way of accomplishing this result is by providing a discrete number of proximity sensors by the lateral edges. As in previous embodiments, the device has a frame 10 with a trigger track opening 12. The trigger track opening 12 has a first lateral edge 30 which is lateral to the trigger 14. The trigger 14 is coupled to the frame 10 such that the trigger goes through the trigger track opening 12. Furthermore, the trigger 14 is biased to a resting position 78. This resting position 78 is the position of the trigger 14 when it is not pulled by the marksman. As is known in the art, if the marksman is pulling the trigger 14 to the lateral edge early in the trigger pull, there is a greater degree of error in the pull of the trigger 14. Thus, a first proximity sensor 80 with a first sensing zone 88 is mounted proximate to trigger track opening 12 along the first lateral edge 30. In addition, a second proximity sensor 82 with a second sensing zone 82A is mounted proximate the trigger track opening 12 along the first lateral edge 30. Each proximity sensor 80, 82 is connected to an indicator 16. The indicator 16 has a first signaling device 77 for emitting a first signal and a second signaling device 79 for emitting a second signal. Pulling the trigger 14 within the first sensing zone 88 emits the first signal thereby indicating that the trigger 14 has been inappropriately pulled toward the first lateral edge 30. Similarly pulling the trigger 14 within the second sensing zone 82A emits the second signal thereby also indicating that the trigger 14 has been inappropriately pulled toward the first lateral edge 30. However, the first proximity sensor 80A is mounted closer to the resting position 78 than the second proximity sensor 82. As a result, if the marksman pulls the trigger 14 within the first sensing zone 80A, the marksman has a high degree of error in the trigger pull. In this manner, the first signal indicates greater error in the trigger pull than the second signal.

As shown in FIGS. 6 and 7, the invention can have an even greater degree of sensitivity to trigger pull error by the marksman. As shown, the indicator has a third signaling device 86 for emitting a third signal. A third proximity sensor 84 with a third sensing zone 84A is mounted proximate the first lateral edge 30 and is connected to the indicator 16. As with the other two proximity sensors 80 and 82, pulling the trigger within the third sensing zone 84A indicates that the trigger 14 has been inappropriately pulled toward the first lateral edge 30. However, the first proximity sensor 80 and the second proximity sensor 82 are mounted closer to the resting position 78 than the third proximity sensor 84 such that the first signal and the second signal indicate greater error in the trigger pull than the third signal. As a result, the third signal indicates only slight error in the trigger pull. As should be appreciated, the device is not limited to a particular number of proximity sensors. The user of the device can achieve any degree of sensitivity to trigger pull error by simply adding a greater number of proximity sensors to the proximity of the trigger track opening 12.

The same result can be achieved along the second lateral edge 32. The indicator 16 has a fourth signaling device 87 for emitting a fourth signal and a fifth signaling device 88 for emitting a fifth signal. A fourth proximity sensor 90 with a fourth sensing zone 90A is mounted proximate the second lateral edge 32 and is connected to the indicator 16 whereby pulling the trigger 14 within the fourth sensing zone 90A emits the fourth signal. This indicates that the trigger 14 has been inappropriately pulled toward the second lateral edge 32. Similarly, a fifth proximity sensor 92 with a fifth sensing zone 92A is mounted proximate the second lateral edge 32 whereby pulling the trigger within the fifth sensing zone emits the fifth signal thereby indicating that the trigger has been inappropriately pulled toward the second lateral edge 32. In order to indicate a greater degree of error, the fourth proximity sensor 90 is mounted closer to the resting position 78 than the fifth proximity sensor 92 such that the fourth signal indicates greater error in the trigger pull than the fifth signal. Furthermore, the indicator 16 may have a sixth signaling device 94 for emitting a sixth signal. A sixth proximity sensor 96 is also connected to the indicator 16. The sixth proximity sensor 96 has a sixth sensing zone 96A and is mounted proximate the second lateral edge 32. The fourth proximity sensor 90 and the fifth proximity sensor 92 are mounted closer to the resting position 78 than the sixth proximity sensor 96 such that the fourth signal and the fifth signal indicate greater error in the trigger pull than the sixth signal.

Figure 8:
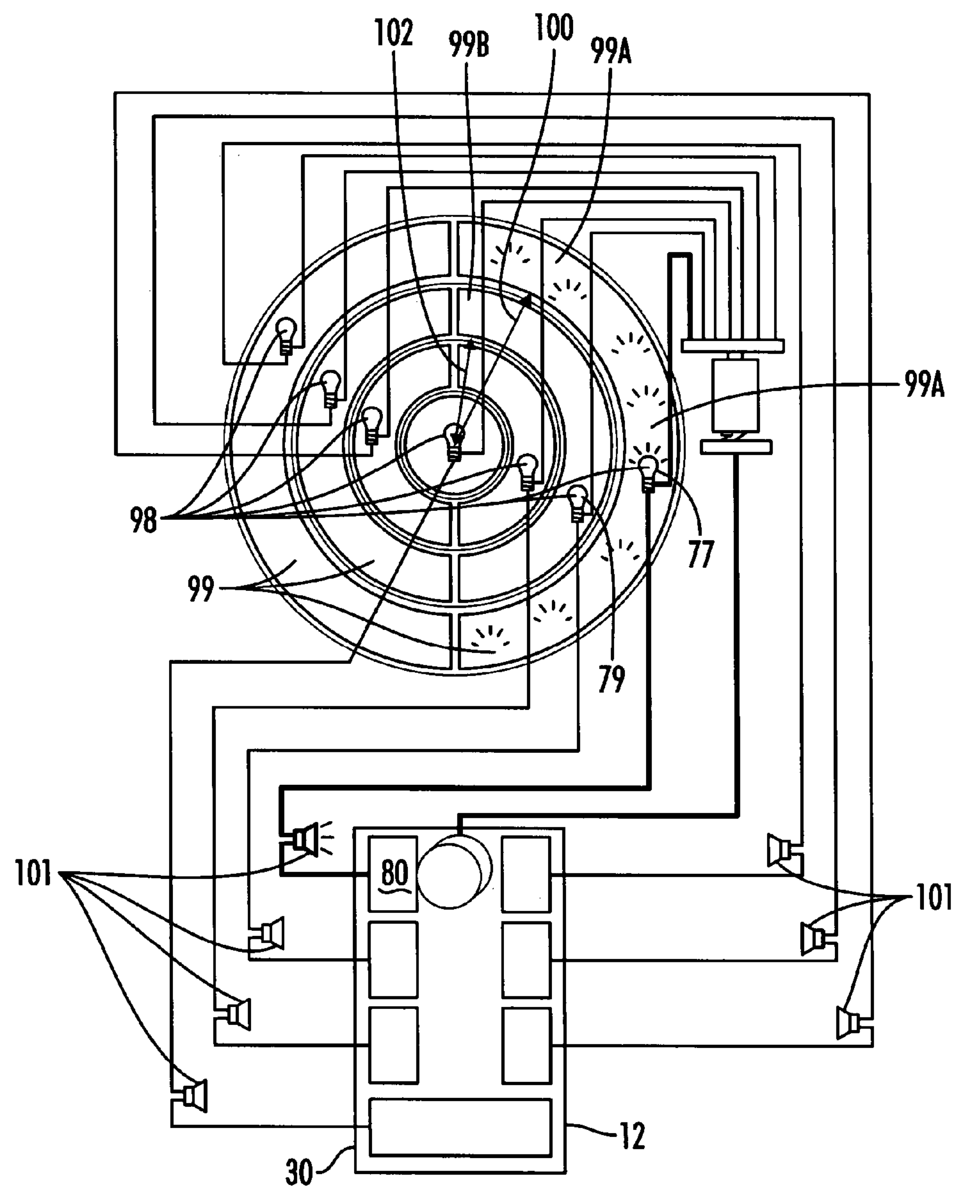
FIG. 8 is a top view of the third embodiment of this device, showing the operation of the indicator when the trigger is within the sensing zone.

Referring now to FIG. 8 the indicator 16 can be arranged to clearly indicate the degree of error by the marksman. As shown in the figure, the signaling devices may be light emitters 98 whereby the signals are an emission of light. In addition, the device may emit sounds from sound emitters 101 as part of the signal. The indicator 16 is divided into sections 99. Each section 99 contains a signaling device whereby the section is illuminated by the emission of the respective signal. For example, signaling devices 77 and 79 are contained within sections 99A and 99B, respectively. Furthermore, each section 99 may be in the shape of a circular arc. The arcs are concentric with arcs with greater degree of error having a greater radius than arcs indicating a lesser degree of error. For example, the first section 99A containing the first signaling device 77 has a radius 100. Section 99B containing signaling device 79 has a second radius 102. The first radius 100 is greater than the second radius 102 because the first signaling device 77 emits a signal indicating a greater degree of error than the signal emitted by the second signaling device 79. As is shown in FIG. 8, the sections 99 may be on the opposite side of their respective proximity sensors. For example, as is shown in FIG. 8 section 99A is on a side opposite first proximity sensor 80. This is because if the marksman pulls the trigger 14 to the left, the barrel of the gun will go to the right, or vice versa. Therefore signaling device 77 indicates that the trigger 14 has been inappropriately pulled toward the first lateral edge 30 which in the diagram is on the left side by placing the first signaling 77 on the right side of the indicator 16. In this manner, the device easily communicates the effect of an inappropriate trigger pull to the marksman.

Referring again to FIG. 6, as previously mentioned although the device may utilize an actual gun frame, attaching the trigger 14 with a conventional trigger pull mechanism, other means may be utilized to attach the trigger to a frame 10. As such, recoiling member 24 can also be characterized as a biasing member 104. Biasing member 104 is characterized as such because biasing member 104 biases the trigger 14 to the resting position 78. As shown in FIG. 6 biasing member 104 couples the trigger 14 to the frame 10. Biasing member 104 may have a spring 106 and a rod 112. The spring 106 has a first spring end 108 and a second spring end 110. If a spring 106 is utilized, the first spring end 108 couples the spring 106 to the frame 10. The second spring end 110 is coupled to the rod 112 such that the rod 112 goes through the trigger track opening 12. As such, the spring 106 is the portion of the biasing member 104 which biases the trigger 14 to the resting position 78.

Figure 9:
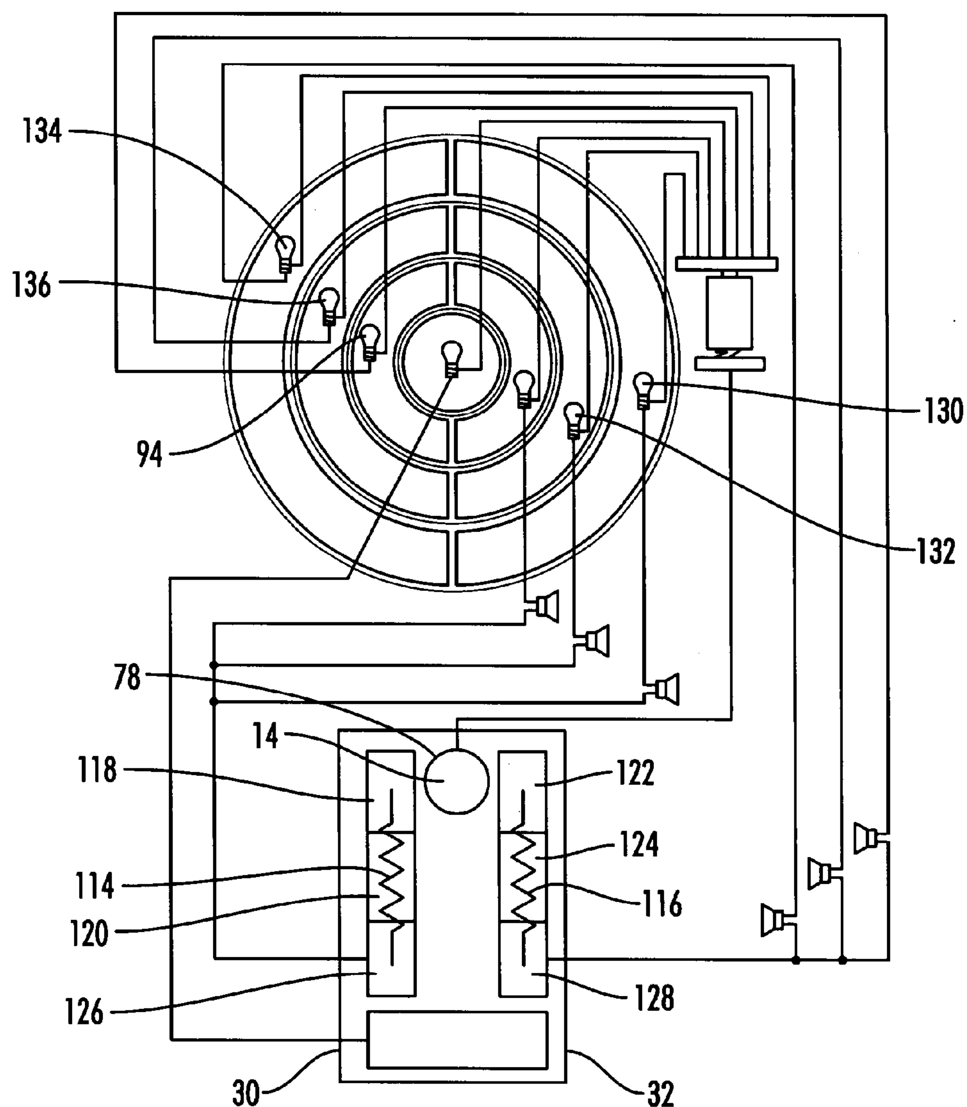
FIG. 9 is a top view of a fourth embodiment of the device utilizing variable resistor.

Referring now to FIG. 9 an alternative method of indicating the degree of error is shown. In order to indicate the degree of error, this embodiment utilizes variable resistance. As shown, a first variable resistor 114 is mounted proximate the first lateral edge 30. The first variable resistor 114 has a first resistor section 118 and a second resistor section 120. The first resistor section 118 is closer to the resting position 78 than the second resistor section 120. The indicator 16 has a first signaling device 130 and a second signaling device 132 for emitting a first and second signal, respectively. These signaling devices 130 and 132 have variable power requirements such that the first signaling device 130 emits a first signal which has a first power range and the second signaling device 132 emits a second signal within a second power range. Pulling the trigger 14 such that the trigger 14 contacts the first resistor section 118 provides power to the indicator 16 within the first power range thereby emitting the first signal. In contrast, pulling the trigger 14 such that the trigger 14 contacts the second resister section 120 provides power to the indicator 16 within the second power range thereby emitting the second signal. In this manner, the first signal indicates greater error in the trigger pull than the second signal because the marksman has jerked the trigger closer to the resting position 78.

Similarly, a second variable resistor 116 is mounted proximate the second lateral edge 32. The second variable resistor 116 has a third resistor section 122 and a fourth resistor section 124 such that the third resistor section 122 is closer to the resting position 78 than the fourth resistor section 124. The indicator 16 has a third signaling device 134 and a fourth signaling device 136 with variable power requirements. Pulling the trigger 14 such that the trigger 14 contacts the third resistor section 122 provides power to the indicator 16 within the third power range and similarly pulling the trigger 14 such that the trigger 14 contacts the fourth resistor section 124 provides power to the indicator 16 within the fourth power range. Thus the third and fourth signals are emitted according to which section the trigger 14 contacts the second variable resistor 116. In this manner, the third signal indicates a greater error in the trigger pull than the fourth signal because the third section 122 is closer to the resting position 78 than the fourth resistor section 124.

Finally, as shown in FIG. 9, by having signaling devices with a greater sensitivity to power input the device can indicate the degree of error to the marksman. For example, as shown in FIG. 9 the first variable resistor 114 can have another resistor section 126. This resistor section 126 is not as close to the resting position 78 as first and second resistor sections 118 and 120. Furthermore, the second variable resistor 120 may have a sixth variable resistor section 128. The third and fourth resistor sections 122 and 124 are closer to the resting position 78 than the sixth section 128. The indicator 16 will have a fifth signaling device 126 for emitting a fifth signal within a fifth power range and a sixth signaling device 128 for emitting a sixth signal within a sixth power range. Pulling the trigger 14 so that the trigger contacts the fifth resistor section 126 provides power to the indicator 16 within the fifth power range thereby emitting the fifth signal whereby first and second signals indicate greater error in the trigger pull than the fifth signal. Similarly, pulling the trigger 14 so that the trigger contacts the sixth resistor section 126 provides power to the indicator 16 within the sixth power range thereby emitting the sixth signal whereby the third and fourth signals indicate greater error in the trigger pull than the sixth signal. However, this device is not limited to a particular number of sections and the user can provide any degree of sensitivity to an inappropriate trigger pull simply by adding signaling devices with a greater degree of sensitivity.

Referring to specifically to FIG. 1, when proximity sensors 20 and 36 are conductive members 40, the device may further comprise a power source 56. The power source 56 connects to the trigger 14 whereby pulling the trigger 14 such that the trigger 14 contacts the surface areas 42 electrically couples the power source 56 to the first signaling devices 18 and 34 thereby emitting the respective signals. However, the power source 56 need not be actually present inside the device in order to achieve full functionality. The power source 56 may be provided in the device for convenience.

Thus, although there have been described particular embodiments of the present invention of a new and useful Shooting Training Device, it is not intended that such references be construed as limitations upon the scope of this invention except as set forth in the following claims.

The invention claimed is:

1. A device for training a firearm user to perform an in-line trigger pull, comprising:

a firearm frame;

a trigger attached to the frame, the trigger being moveable in a longitudinal direction and in a transverse lateral direction;

a first sensor attached to the frame;

an electronic error indicator in communication with the first sensor, wherein the electronic error indicator provides an error signal to the firearm user when the firearm trigger is moved a predetermined lateral distance relative to the frame;

a second sensor attached to the frame; and an electronic success indicator in communication with the second sensor, wherein the electronic success indicator provides a success signal to the firearm user when the firearm trigger is moved a predetermined longitudinal distance relative to the frame without being moved in the lateral direction beyond the predetermined lateral distance.

2. The apparatus of claim 1, wherein the electronic success indicator is a visual signal.

3. The apparatus of claim 2, wherein the electronic error indicator is a visual signal.

4. A method of communicating trigger displacement information to a user during a simulated trigger pull on a firearm body, comprising:

(a) detecting lateral displacement of the trigger during the trigger pull via a first sensor positioned to sense lateral displacement of the trigger;

(b) communicating an error signal to the user when the first sensor detects lateral displacement of the trigger beyond a predetermined lateral distance;

(c) detecting longitudinal displacement of the trigger during the trigger pull via a second sensor positioned to sense longitudinal displacement of the trigger; and (d) communicating a success signal to the user when both the second sensor detects longitudinal displacement of the trigger beyond a predetermined longitudinal distance and the first sensor does not detect lateral displacement of the trigger beyond the predetermined lateral distance.

5. The apparatus of claim 4, wherein the error signal is a visual signal.

6. The apparatus of claim 5, wherein the success signal is a visual signal.

* * * * *